Sept. 24, 1940.      W. E. ANDREWS      2,215,992
BRAKE TESTING METER
Filed April 26, 1938
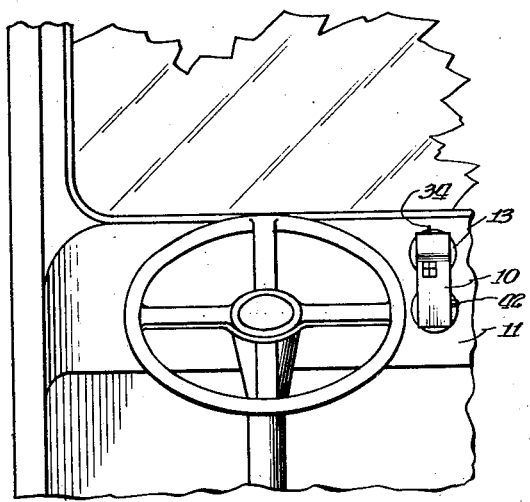
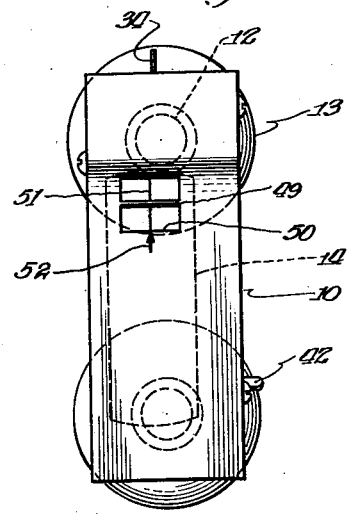
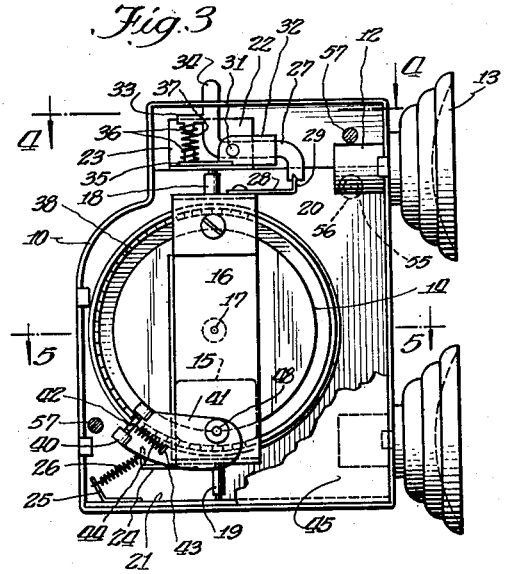
Inventor:
Willard E. Andrews
By: Stewart Batchelor
Atty's.

Patented Sept. 24, 1940

2,215,992

UNITED STATES PATENT OFFICE 2,215,992

BRAKE TESTING METER

Willard E. Andrews, Sycamore, Ill.

Application April 26, 1938, Serial No. 204,440

7 Claims. (Cl. 264—1)

My invention relates to brake testing meters for motor cars, and particularly those operating on the principle of a decelerometer having a pivoted mass in a drum-shaped dial, and my main object is to provide a development of the decelerometer with a unit which indicates the direction and comparative extent of side sway of the motor car due to unequalized brakes.

A further object of the invention is to combine the above values in a compact assembly and with readings in a single zone.

With the above objects in view, and any others which may suggest themselves from the description to follow, a better understanding of the invention may be had by reference to the accompanying drawing, in which—

Fig. 1 is a fragmentary elevation of an automobile interior showing the meter mounted on the dash;

Fig. 2 is a full-sized elevation of the meter;

Fig. 3 is a side view from the right, partly broken away, showing the interior of the meter;

Figs. 4 and 5 are, respectively, sections on the line 4—4 and 5—5 of Fig. 3; and Fig. 6 is a fragmental elevation of the lower portion of the meter casing.

In accordance with the foregoing, specific reference to the drawing indicates the casing of the meter at 10, the same preferably being of prism-like form and narrow in comparison with its height and depth. These dimensions measure only a few inches, so that the meter is sufficiently small to be carried in a door pocket or in a tool box. When it is to be used, it is applied with its back towards the dash 11 of the car, the back of the meter carrying fasteners 12 for upper and lower vacuum cups 13 of the popular rubber type. Thus, the meter can be pressed against the dash 11 to assume the position shown in Fig. 1 and remain in such position until the test has been completed. Consequently, no screws or other special attaching means are required or will show on the dash after the meter has been removed.

The main unit of the meter comprises a light metal drum 14, within whose rim is secured a weight 15. The drum is rotatably and freely mounted on a horizontal axis. Thus, with the meter positioned as in Fig. 1, and the car in motion, the sudden action to stop the car by the application of the brakes will cause the drum 14 to rotate in a counter-clockwise direction as seen in Fig. 3, by the momentum of the weight 15.

The drum is mounted in a quadrilateral frame 16 whose sides are perforated in the center to journal the spindle 17 of the drum. The frame 16 has spindle portions 18 and 19 projecting from the top and bottom and pointed at their extremities.

The casing 10 is of light metal, and is reinforced on the side by a wall plate 20 having a bottom bend 21 on the floor of the casing. Also, the plate 20 has an upward projection 22. An angle bracket 23 is directed laterally from the plate projection 22 and perforated in its horizontal section to receive the point of the spindle portion 18; likewise the bottom bend 21 of the plate is perforated to receive the point of the spindle portion 19, so that the frame 16 becomes freely mounted for rotation about a vertical axis represented by the spindle portions 18 and 19.

The bottom of the frame 16 has a forward extension 24 opposite which the plate bend 21 carries a bracket 25. A small draw spring 26 connects the extension 24 and the bracket 25 and serves to maintain the drum in its medial position, that is, in line with the direction of travel. At the same time I provide a detent 27 over the drum for the purpose of retaining it in any position of departure from its normal position. Thus, the frame 16 has a forward lug 28 at the top, the lug having an upward terminal bend 29 whose top surface is serrated as indicated at 30 in Fig. 4. The detent 27 is mounted on a horizontal pivot 31 to be rockable in a sheath 32 fastened on the horizontal section of the bracket 23. The detent has a rearward extension 33 from the pivot and then an upward extension 34 which passes through a slot in the casing to serve as a finger control. The base 35 of the sheath 32 and the extension 33 have opposite lugs 36, between which is mounted an expansion spring 37. The latter originally maintains the detent 27 in engagement with the serrated edge of the extension 28 and serves as a check for the same when the drum swings sidewise, so as to retain the drum in the position to which it has swung.

The drum 14 being freely journaled, it may be assumed that its weight 15 is always at the bottom under normal conditions. In order to control the rotation of the drum due to deceleration in the direction of vehicle travel as explained in a previous section, I apply a check similar to one just described for its lateral deviation. Thus, the edge of the drum rim 37 is formed with a series of ratchet serrations 38, the inclination of these being outward toward the rear. Co-operative with the ratchet serrations is a detent 39 pivoted in bearings 40 formed from a plate 41 carried by one side of the frame 16. The detent has an extension 42 beyond the pivot, and the plate 41 has a lug 43 opposite the extension. A draw spring 44 joins the lug 43 with the extension 42 in a manner to keep the detent in engagement with the edge of the drum. The casing has a removable side plate 45 which is perforated at 46 for the passage of the extension 42 that the same may serve as a finger control. Likewise, the side plate 45 has a slot 47 for the passage of a pin 48 from the central point near the bottom of the frame 16. It will now be evident that the rotation of the drum 14 when a stopping test is made will cause the detent 39 to trip the serrations 38 until the drum stops, the detent then retaining the drum in the departed position.

In order that the action of the drum in both the vertical and horizontal planes may be indicated, the drum is marked on its surface with a scale in terms of feet, reading in relation to a reference bar 49 formed in the front of the casing. This bar is in the center of a window 50 formed in such front. It is understood that the scale will read at zero when the drum is in normal position, that is, with the weight down, and that the scale will progress as the drum turns to indicate opposite the reference bar the number of feet in which the car was brought to a stop from a given vehicle speed. To facilitate the reading of the drum during its lateral motion the drum rim 17 is of concavo-convex form and marked with a longitudinal section line 51. Thus, if the stopping action of the car includes a side sway because of a lesser application of the brakes on one side of the running gear, then the swing of the drum will carry its line 51 over to the particular side, so as to plainly indicate through the window 50 relative to a reference arrow 52 under the window on what side the defective brakes occur. It will be apparent that with the inertia of the vehicle wholly in a forward direction before the brakes are applied, the predominant effect of the test will be on the decelerometer; and the latter is therefore designed to have a long path of deflection. However, as to the transverse acceleration indicator, the rotation of the vehicle on the test is relatively short, so that the incidental swing of the drum 14 is not sufficient to throw it out of its decelerating plane so far as to cause an appreciable error in its reading. The meter is intended as a practical motor car accessory, similar to the conventional tire gage, and not as a scientific instrument.

After a test has been made, the meter may be restored to normal position by first drawing rearwardly on the finger control 34 to make the detent 27 release the frame extension 28. This will cause the drum to be returned to the medial position. Then a rearward pull on the finger control 42 will release the drum from the hold of the detent 39, so that the weight 15 will cause the drum to rotate back to its normal position. The protruding pin 48 indicates by its position what the lateral setting of the drum may be, and in case the drum does not readily return to its medial position, the pin 48 may be vibrated with the finger to aid the spring 26 in drawing the drum back to the normal position. The positive control or adjustment represented by the pin 48 is provided because of the necessarily light tension of the spring 26. This tension must be light in order not to exert a drag on the lateral turning effort of the drum, and it follows that the spring may not always have sufficient power to bring the drum back to normal position against the frictional resistance of the detent 27. A positive control or setting need not be provided for the drum in respect to rotation on a horizontal axis, since the weight 15 is sufficiently heavy to restore the drum to normal position when the finger control 42 is actuated.

The wall plate 20 is snugly fitted or pressed into the casing, being in addition tapped at 55 to receive a fastening screw 56 driven through the related side of the casing. The wall plate is also tapped to receive two screws 57 which are driven through the side plate 45 when the same is secured as a closure for the casing. The wall and side plates may of course be secured otherwise if it is done to better advantage.

It will be evident from the above description that I have provided a meter which combines in a compact assembly both the unit for the forward brake test and that for unequalized brakes. The frame 16 forms a common medium for the units and enables them to indicate the results of both tests through the single frontal window. Finally, the assembly has a balanced design, handy resetting means, and is an efficient mechanism for practical purposes.

I claim:

1. The combination with a decelerometer having a pendulum in the form of a weighted drum pivoted to move in a longitudinal plane about a horizontal axis due to deceleration forces, a center bearing for supporting said drum for movement, and means to pivot the bearing about a vertical axis, to permit a limited lateral deflection of said drum from a normal position parallel to the plane of said deceleration forces, to give an indication of the presence of any transverse forces acting on said pendulum.

2. The structure of claim 1, and yieldable means to maintain the drum in said normal position.

3. The structure of claim 1, a support for said means, and a spring between the support and said bearing to normally maintain the drum in said plane.

4. The structure of claim 1, supports above and below the drum, and providing vertically aligned shaft journals, and said bearing comprising a vertical frame surrounding the drum, said means being spindles vertically extended from the upper and lower portions of the frame into the corresponding journals of the supports.

5. The structure of claim 1, supports above and below the drum providing vertically aligned shaft journals, spindles from the bearing and entering the corresponding journals of the supports, an arm projected laterally from the bearing below the upper support and having a serrated top edge, and a spring-backed detent carried by said upper support and engageable with said edge.

6. The structure of claim 1, supports above and below the drum providing vertically aligned shaft journals, spindles from the bearing and entering the corresponding journals of the supports, an arm projected laterally from the bearing below the upper support and having a serrated top edge, a spring-backed detent carried by said upper support and engageable with said edge, a casing for the parts described and having a top opening, and a lever extended from the detent through said opening for the release of the detent from the outside of the casing.

7. The structure of claim 1, a casing for the said parts and having a wall in proximity to the periphery of the drum and formed with a window, the drum having its periphery transversely convexed for the clearance of said wall during the lateral deflection of the drum.

WILLARD E. ANDREWS.